US010696067B2

(12) United States Patent
Kuronuma

(10) Patent No.: US 10,696,067 B2
(45) Date of Patent: Jun. 30, 2020

(54) NAIL PRINTING APPARATUS AND CONTROL METHOD

(71) Applicant: CASIO COMPUTER CO., LTD., Shibuya-ku, Tokyo (JP)

(72) Inventor: Hirotaka Kuronuma, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 183 days.

(21) Appl. No.: 16/020,589

(22) Filed: Jun. 27, 2018

(65) Prior Publication Data

US 2019/0001705 A1 Jan. 3, 2019

(30) Foreign Application Priority Data

Jun. 29, 2017 (JP) ................................. 2017-127403

(51) Int. Cl.

| | |
|---|---|
| ***G06F 3/12*** | (2006.01) |
| ***B41J 3/46*** | (2006.01) |
| ***B41J 3/407*** | (2006.01) |
| ***A45D 29/18*** | (2006.01) |
| ***B41J 11/00*** | (2006.01) |
| ***A45D 29/00*** | (2006.01) |

(52) U.S. Cl.

CPC ................ *B41J 3/46* (2013.01); *A45D 29/00* (2013.01); *A45D 29/18* (2013.01); *B41J 3/4073* (2013.01); *B41J 11/008* (2013.01); *A45D 2029/002* (2013.01); *A45D 2029/005* (2013.01)

(58) Field of Classification Search

None

See application file for complete search history.

(56) References Cited

U.S. PATENT DOCUMENTS

| | | | | |
|---|---|---|---|---|
| 6,286,517 B1 * | 9/2001 | Weber | .................... | A45D 29/00 132/200 |
| 6,336,694 B1 * | 1/2002 | Ishizaka | ................. | A45D 29/00 347/105 |
| 2013/0038648 A1 * | 2/2013 | Kasahara | ................ | B41J 3/407 347/2 |

(Continued)

FOREIGN PATENT DOCUMENTS

| | | |
|---|---|---|
| JP | 2000301778 A | 10/2000 |
| JP | 2005185709 A | 7/2005 |

(Continued)

*Primary Examiner* — Ted W Barnes

(74) *Attorney, Agent, or Firm* — Holtz, Holtz & Volek PC

(57) ABSTRACT

A nail printing apparatus comprising:

a print head configured to perform printing on a nail of one of a finger of a hand and a toe of a foot; and a processor configured to detect, from a nail image captured of the nail of one of the finger and the toe, a nail area that is a target of the printing performed by the print head;

wherein the processor is further configured to:

divide the nail area into a first area on a nail root side of the nail and a second area on a nail free edge side of the nail to store information of the first area in a memory; and, in accordance that the information of the first area is stored in the memory, when detecting the nail area from the nail image, forgo detecting the first area, and reads out the information of the first area stored in the memory.

14 Claims, 9 Drawing Sheets

(56) References Cited

U.S. PATENT DOCUMENTS

| | | | | |
|---|---|---|---|---|
| 2015/0007841 A1* | 1/2015 | Yamasaki | A45D 29/00 | 132/73.5 |
| 2015/0062216 A1* | 3/2015 | Yamasaki | B41J 3/4073 | 347/9 |
| 2016/0088197 A1* | 3/2016 | Yamasaki | H04N 5/225 | 132/73.6 |
| 2016/0088918 A1* | 3/2016 | Nagao | A45D 29/00 | 132/200 |
| 2016/0182867 A1* | 6/2016 | Nagao | G06K 9/209 | 348/77 |
| 2016/0183657 A1* | 6/2016 | Nagao | G06K 9/00375 | 132/200 |
| 2017/0000235 A1* | 1/2017 | Teshima | G06T 7/33 | |
| 2017/0079402 A1* | 3/2017 | Miyamoto | G06K 9/32 | |
| 2017/0172279 A1* | 6/2017 | Nagao | A45D 34/04 | |
| 2017/0193651 A1* | 7/2017 | Yamasaki | G06T 7/74 | |

FOREIGN PATENT DOCUMENTS

| | | |
|---|---|---|
| JP | 2013059579 A | 4/2013 |
| JP | 2015047473 A | 3/2015 |

* cited by examiner

FIG. 7A
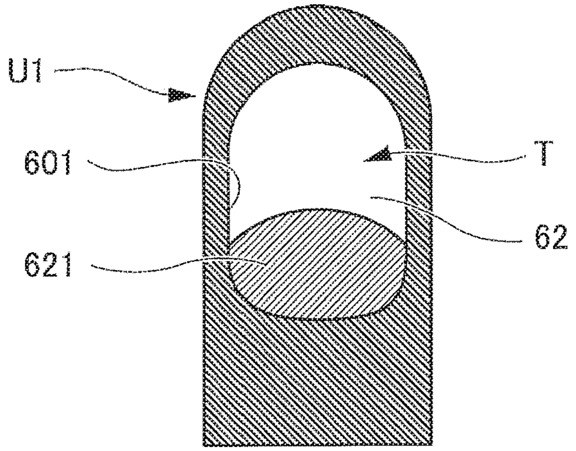
FIG. 7B
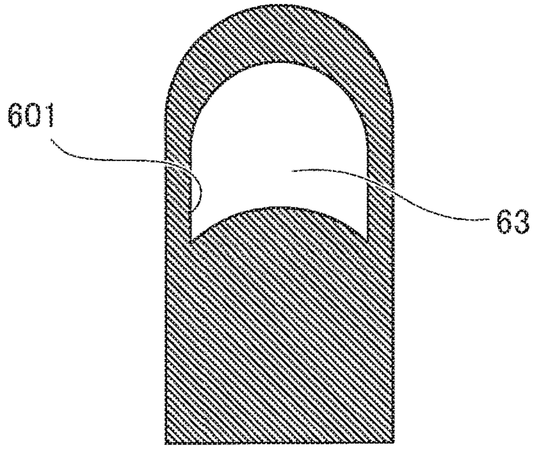
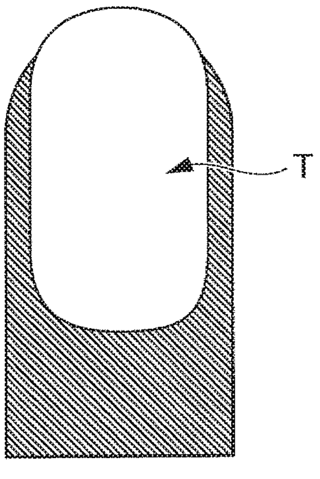
FIG. 7C
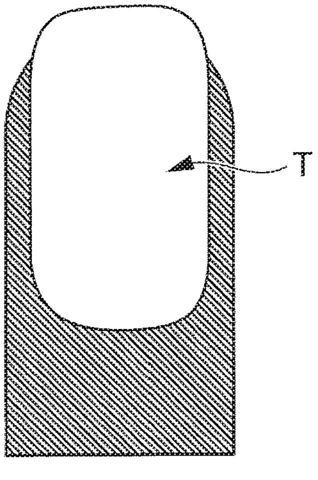
FIG. 7D
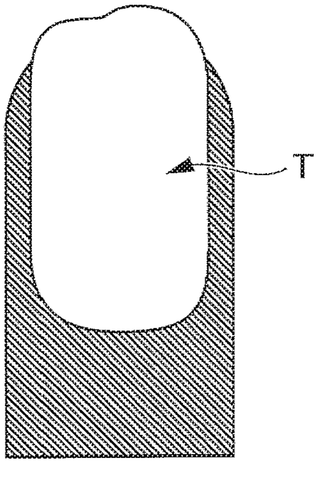
FIG. 7E

NAIL PRINTING APPARATUS AND CONTROL METHOD

CROSS-REFERENCE TO RELATED APPLICATIONS

This application is based upon and claims the benefit of priority under 35 USC 119 of Japanese Patent Application No. 2017-127403 filed on Jun. 29, 2017 the entire disclosure of which, including the description, claims, drawings, and abstract, is incorporated herein by reference in its entirety.

BACKGROUND OF THE INVENTION

The present invention relates to a nail printing apparatus and a control method.

DESCRIPTION OF THE RELATED ART

In related art, desired colors and patterns are applied to fingernails of a hand or of a foot and decorative effects are enjoyed (JP 2000-301778 A, and JP 2013-59579 A, for example).

In JP 2000-301778 A, an artificial nail, on a surface of which desired colors and patterns are applied, is adhered to a fingernail. Further, in JP 2013-59579 A, patterns are directly printed on a human nail of a hand or of a foot.

When such an artificial nail is created, and when the patterns are directly printed on the nail, a shape (contour) of the nail is detected by capturing an image of a tip of a finger, using an optical sensor such as a camera, and a nail area is registered. By doing this, the registered nail area is used as an effective area (a design area) when editing a design. Then, a pattern is selected in correspondence to the registered effective area, and after that, an inkjet print unit is used, for example, to print the pattern on the artificial nail or the human nail.

However, the color and condition of the nail and skin are different depending on the person, and thus, when detecting the contour of the nail, the contour is sometimes mistakenly detected. Further, in the case of a French manicure nail where the root of the nail is not decorated, for example, the whole area of the nail is not always desirable to be the effective area for the printing. In such a case, the detected nail area is corrected and is registered as the effective area for design editing. At this time, if a change occurs in the nail area, even of the same user, when a shape in which the free edge of the nail is cut changes, or when the nail grows as a physiological phenomenon, for example, it is necessary to correct registration content and update the registration. In this type of case, in relation to the whole of an area that has been once more recognized as the nail, it is necessary to re-perform the same corrections as a previous time. As a result, it takes time and effort to perform the corrections, and there are cases in which it is not possible to reproduce the design area that was beautifully corrected and obtained the previous time.

BRIEF SUMMARY OF THE INVENTION

An object of the present invention is to provide a nail printing apparatus and a nail printing method offering the advantage of being able to reduce time and effort for correcting a nail area detected from a nail image.

According to an embodiment of the present invention,

A nail printing apparatus comprising:

a print head that prints on a nail of one of a finger of a hand and a toe of a foot; and a processor, wherein the processor performs following:

detecting a nail area from a nail image captured of the nail of one of the finger and the toe;

dividing the nail area into a first area on a nail root side of the nail and a second area on a nail free edge side of the nail; and storing information of the first area in a memory, wherein when the information of the first area is stored in the memory, the processor reads out the information of the first area stored in the memory without detecting the first area.

According to an embodiment of the present invention, the nail printing apparatus according to claim 1, wherein, when a non-print area on which the printing by the print head is not be performed is set in the nail area, the processor performs dividing an area excluding the non-print area from the nail area into the first area and the second area.

According to an embodiment of the present invention,

A control method of a nail printing apparatus including a print head that performs printing on a nail of one of a finger of a hand and a toe of a foot, the control method comprising the steps of:

d detecting a nail area from a nail image captured of the nail of one of the finger and the toe;

dividing the nail area into a first area on a nail root side of the nail and a second area on a nail free edge side of the nail; and storing information of the first area in a memory, wherein when the information of the first area is stored in the memory, the processor reads out the information of the first area stored in the memory without detecting the first area.

BRIEF DESCRIPTION OF THE SEVERAL VIEWS OF THE DRAWINGS

FIG. 7A is a plan view illustrating a non-print area of the nail area; FIG. 7B is a plan view illustrating the nail area reflecting the non-print area; FIG. 7C is a plan view illustrating a case in which a nail has grown; FIG. 7D is a plan view illustrating a case in which a shape in which a free edge of the nail is cut has been changed; and FIG. 7E is a plan view illustrating a case in which a part of the nail free edge side is missing.

FIG. 9A is a plan view of the nail area illustrating the invariant area and the variant area set using the boundary line; FIG. 9B is a plan view of the nail area when the non-print area is in the invariant area; and FIG. 9C is a plan view of the nail area illustrating the invariant area and the variant area reflecting the non-print area.

DETAILED DESCRIPTION OF THE INVENTION

Figure 1:
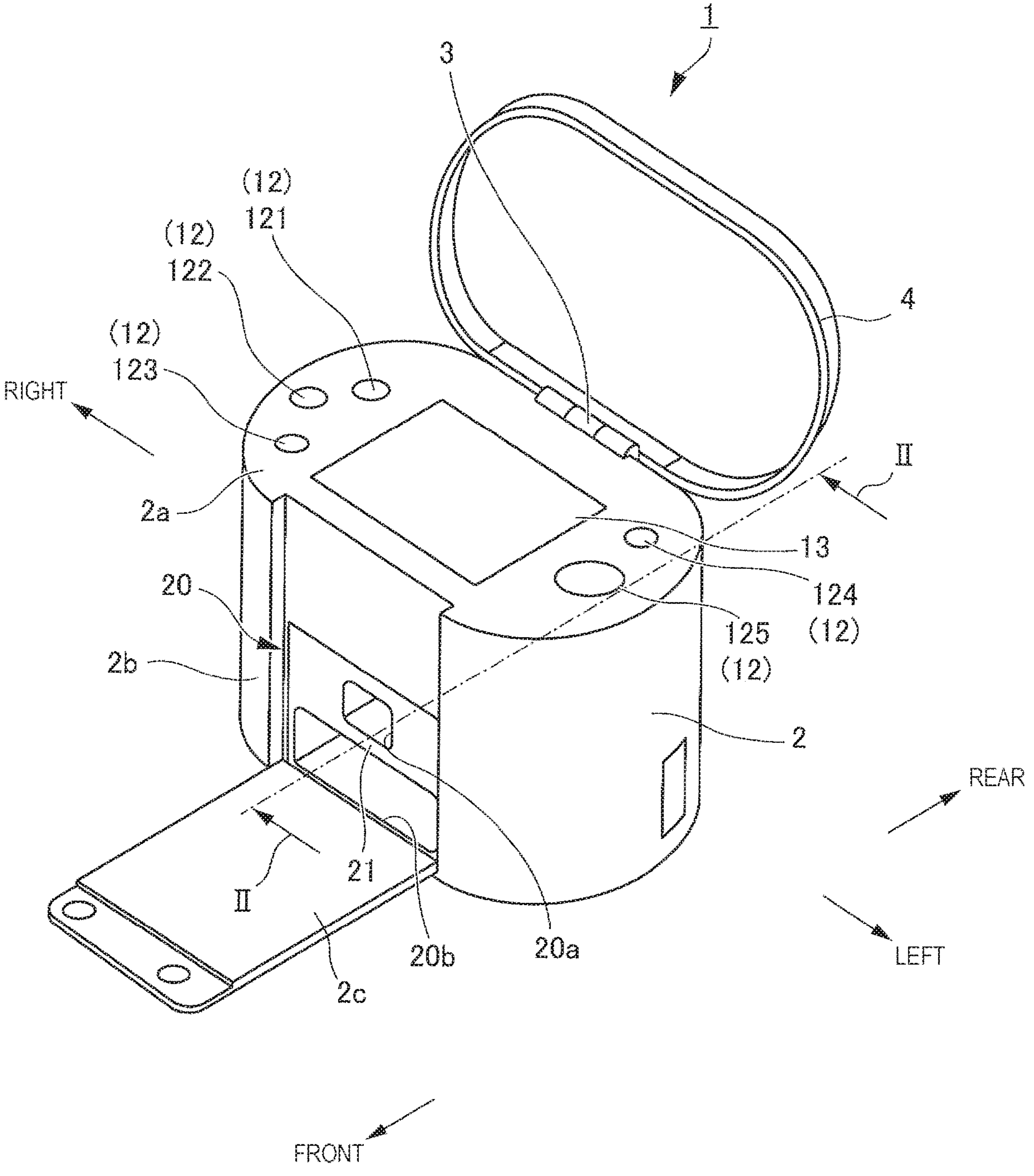
FIG. 1 is a perspective view illustrating a state in which a lid of a nail printing apparatus according to a present embodiment is open.

Modes (hereinafter referred to as embodiments) of the present invention will be described below in detail with reference to the drawings. While various limitations, which are technically preferable from the perspective of carrying out the present invention, are placed on the embodiments described below, the scope of the present invention should not be construed to be limited to the embodiments or the examples illustrated in the drawings. Note that the same reference numbers are assigned to the same structural elements through the whole description of the embodiments.

FIG. 1 is a perspective view illustrating a state in which a lid 4 of a nail printing apparatus 1 according to a present embodiment is open.

As illustrated in FIG. 1, the nail printing apparatus 1 is provided with a case body 2 and the lid 4. The lid 4 is rotatably connected to the case body 2, via a hinge 3 provided on a rear end portion of the top face (a top panel 2*a*) of the case body 2. With the hinge 3 acting as a fulcrum, the lid 4 can rotate from a closed state in which the lid 4 is overlapped with the top panel 2*a* of the case body 2, to an open state (see FIG. 1) in which the lid 4 is standing with respect to the top panel 2*a* of the case body 2, and can be held in the standing open position.

The case body 2 has, for example, a substantially rectangular shape in a plan view as seen from above. An opening/closing plate 2*c* is rotatably provided on a front surface 2*b* of the case body 2. The opening/closing plate 2*c* is connected to the case body 2 via a hinge (not illustrated) provided on a lower end portion of the front surface 2*b* of the case body 2. The opening/closing plate 2*c* is provided in order to open and close the front surface 2*b* of the case body 2. Note that the shapes and configurations of the case body 2 and the lid 4 are examples thereof and are not limited to the examples given here.

An operation unit 12, for a user to perform various inputs, is provided on the top panel 2*a* of the case body 2. A power switch button 121 for turning on the power of the nail printing apparatus 1, a stop switch button 122 for stopping operations, a design selection button 123 for selecting a design image to be printed on a nail T (see FIG. 2), a print start button 124 for commanding the printing to start, and an operation button 125 for performing various other types of input are disposed in the operation unit 12.

A rectangular display device 13, for example, is installed approximately in a center portion of the top panel 2*a* of the case body 2. The display device 13 is configured by, for example, a liquid crystal display, an organic electroluminescence display, or another type of flat display. In the present embodiment, examples of images appropriately displayed on the display device 13 include an image (hereinafter referred to as a "finger image") obtained by imaging a print finger U1 (see FIG. 2) that is a print target, a nail image included in the finger image (an image of an contour line of the nail T or the like), a design selection screen for selecting a design image to be printed on the nail T, a thumbnail image for design confirmation, a command screen for displaying various commands, a notification screen, a warning screen, and the like.

Note that in place of the operation unit 12 that has the above-described various operation buttons, a touch panel may be integrally provided in the surface of the display device 13. In this case, for example, the various inputs can be performed by a touch operation in which the surface of the display device 13 is touched by a fingertip or a stylus pen, or a pointed rod-shaped writing tool or the like. Further, the operation unit 12 and the touch panel can be used in combination with each other.

Figure 2:
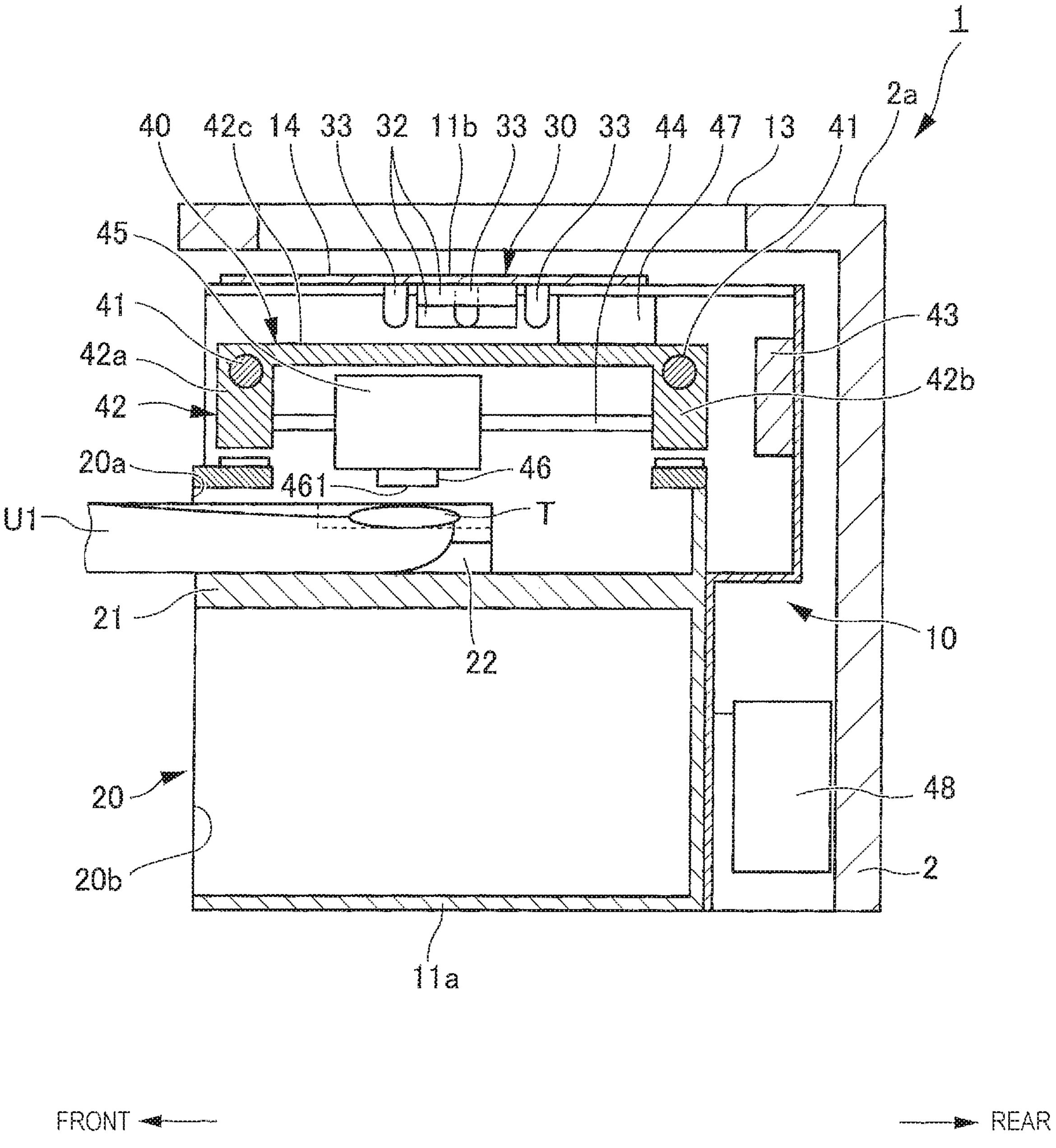
FIG. 2 is a cross-sectional view at a position II-II in FIG. 1.

FIG. 2 is a cross-sectional view at a position II-II of the nail printing apparatus 1 illustrated in FIG. 1.

As illustrated in FIG. 2, an apparatus main body 10 of the nail printing apparatus 1 is housed inside the case body 2. The apparatus main body 10 is formed in a substantially box-shape and is provided with a lower frame 11*a* installed in the lower portion of the interior of the case body 2, and an upper frame 11*b* installed above the lower frame 11*a* and in the upper portion of the interior of the case body 2. Then, a print finger holding unit (means for positioning the finger) 20, an imaging unit 30, a print unit 40, a CPU 50 (see FIG. 3) and the like are provided between the lower frame 11*a* and the upper frame 11*b*.

The print finger holding unit 20 is provided on the lower frame 11*a*, and is provided with a print finger insertion portion 20*a* into which is inserted a print finger U1 having the nail T to be printed, and a non-print finger insertion portion 20*b* into which are inserted fingers other than the print finger U1. The print finger insertion portion 20*a* and the non-print finger insertion portion 20*b* are partitioned by a dividing wall 21, the print finger insertion portion 20*a* being disposed above the dividing wall 21, and the non-print finger insertion portion 20*b* being disposed below the dividing wall 21.

A bottom surface of the print finger insertion portion 20*a* (namely, the top surface of the dividing wall 21) functions as a print finger placement surface on which the print finger U1 is placed on an X-Y plane (a horizontal plane). Further, finger holding parts 22 for holding the print finger U1 on the print finger placement surface are provided on both sides inside the print finger insertion portion 20*a*. Each of the finger holding parts 22 is gently inclined such that the lower side thereof gradually becomes narrower from both sides of the print finger insertion portion 20*a* toward the center thereof and from the front surface 2*b* of the case body 2 toward the interior of the case body 2. As a result, when the print finger U1 is inserted into the print finger insertion portion 20*a*, the print finger U1 is clamped from both sides.

In this way, the print finger U1 that is disposed between the finger holding parts 22 is stable, and is positioned and held so as not to move in the lateral direction.

Note that the shapes, sizes and the like of the print finger insertion portion 20*a* and the finger holding parts 22 are not particularly limited, and in the present embodiment, the print finger insertion portion 20*a* and the finger holding parts 22 are formed in a size to be able to deal with each finger that is inserted individually in order to perform image capture and printing, such that even when an adult thumb or the like is inserted, it is not too tight.

As illustrated in FIG. 2, the imaging unit 30 is provided on the upper frame 11*b*. More specifically, a base plate 14 is installed on the upper frame 11*b*, and a camera 32 is installed, as means for image capture, on a center portion on the bottom surface of the base plate 14. Further, a plurality of illuminating lamps 33, such as white LEDs, are installed on the base plate 14 surrounding the camera 32. Note that a number, shapes, and an arrangement of the illuminating lamps 33 are not limited to those illustrated herein.

Thus, an image is captured, by the camera 32, of the nail T of the print finger U1 that is inserted into the print finger insertion portion 20*a*, that is placed on the print finger placement surface of the print finger insertion portion 20*a* (the top surface of the dividing wall 21), and that is held by the finger holding parts 22 in a state of being illuminated by the illuminating lamps 33. Then, the nail image that is the image of the nail T and a finger image of the free edge side of the print finger U1 are obtained. These nail images are transmitted to a nail information detection unit (means for detecting nail information) 512 of CPU 50, and nail information (first nail information) is detected that includes information of the nail area that is the target of printing by the print unit 40, such as the contour of the nail T (the shape of the nail T) and the like.

Note that image data of the image captured by the imaging unit 30 is stored in a memory unit 52 (described later). Further, the imaging unit 30 is connected to an imaging control unit 511 (described later, see FIG. 3), and is controlled by the imaging control unit 511.

As illustrated in FIG. 2, the print unit 40 is mainly provided on the upper frame 11*b*. More specifically, respective end portions of two guide rods 41 are fixed to plates on both sides of the upper frame 11*b*, and are installed in parallel across the upper frame 11*b*. A main carriage 42 is installed on the guide rods 41 such that the main carriage 42 can freely slide. The main carriage 42 includes a front wall 42*a* and a rear wall 42*b* that extend in the up-down direction, and a top wall 42*c* that connects the front wall 42*a* and the rear wall 42*b*, thus forming a sideways U shape as a whole in cross-section. Then, two guide rods 44 (only one guide rod 44 on the front side is illustrated in FIG. 2) are installed in parallel between the front wall 42*a* and the rear wall 42*b* of the main carriage 42, in a direction orthogonal to the guide rods 41. A sub carriage 45 is installed on the two guide rods 44 such that the sub carriage 45 can freely slide.

A print head 46 is provided on the bottom surface of the sub carriage 45. The print head 46 forms minute droplets from ink, and sprays the ink directly onto the surface of the nail T that is the print target, thus performing printing using the inkjet method.

The print head 46 includes ink discharge ports 461 and each of the ink discharge ports 461 is configured, for example, to discharge one of yellow, magenta, or cyan inks. Alternatively, the ink discharge ports 461 are not limited to discharging these three colors of ink, and may be further provided with the ink discharge ports 461 that discharge inks of other colors.

Meanwhile, an ink cartridge 48 for supplying the ink to the print head 46, is provided on the lower frame 11*a*. The ink cartridge 48 is connected to the print head 46 via an ink supply pipe (not illustrated), and is configured to supply the ink to the print head 46 as necessary, thus causing the ink discharge ports 461 to discharge each of the inks. Note that the print head 46 itself may be configured to incorporate the ink cartridge 48.

The main carriage 42 is connected to a first motor 43 via a power transmission unit (not illustrated), and moves in the left-right direction (a direction orthogonal to the page in FIG. 2) of the nail printing apparatus 1, along the guide rods 41, in accordance with the forward and reverse rotation of the first motor 43. Further, the sub carriage 45 is connected to a second motor 47 via a power transmission unit (not illustrated), and is configured to move in the front-back direction (the left-right direction in FIG. 2) of the nail printing apparatus 1, along the guide rods 44, in accordance with the forward and reverse rotation of the second motor 47. In this way, the print head 46 can freely move in the X-Y plane.

Note that the first motor 43, the print head 46, and the second motor 47 are connected to a printing control unit 514 (described later, see FIG. 3) of the CPU 50, and are configured to be controlled by the printing control unit 514.

Figure 3:
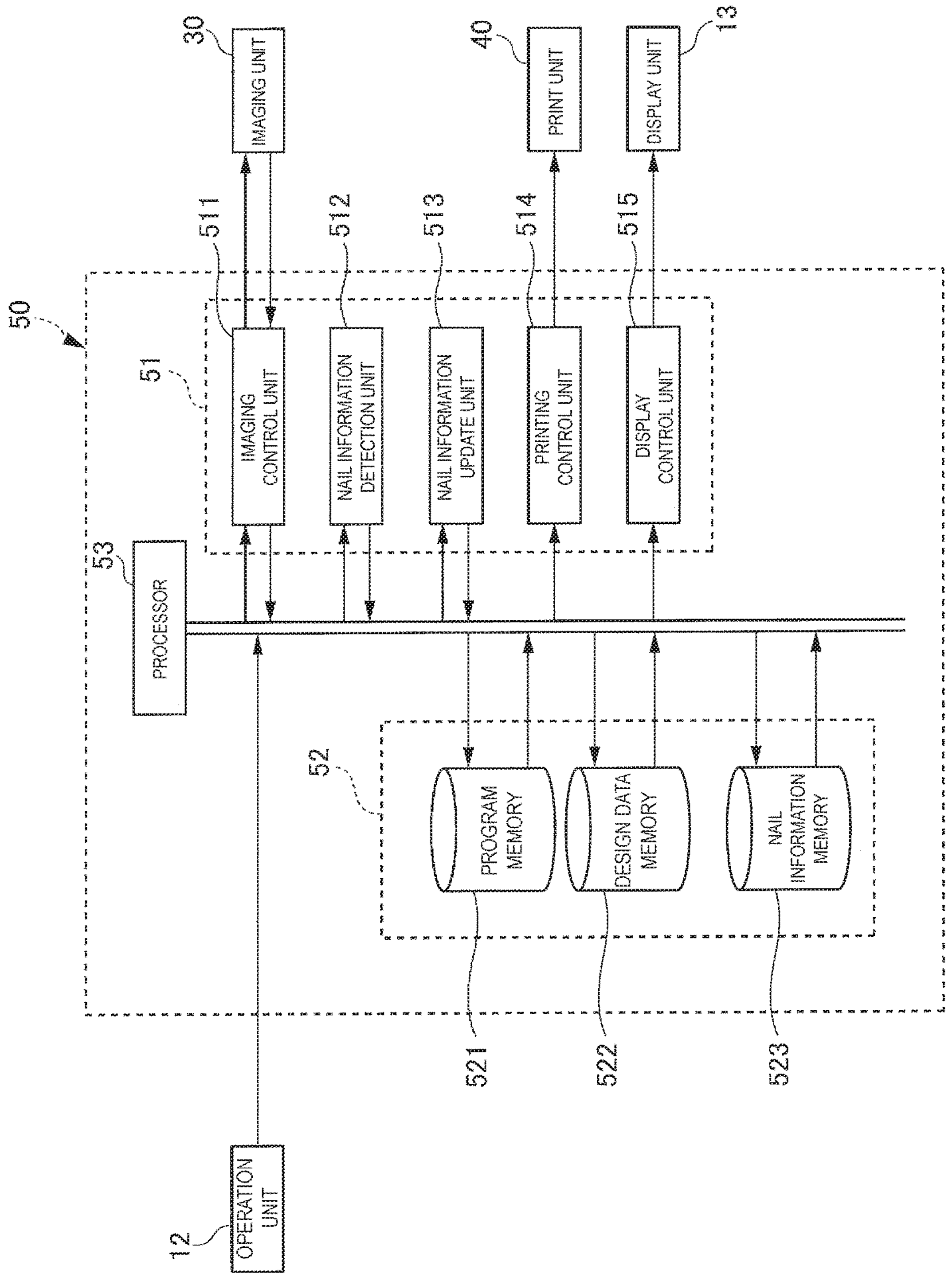
FIG. 3 is a block diagram illustrating an internal configuration of a CPU.

FIG. 3 is a block diagram illustrating an internal configuration of the CPU 50.

As illustrated in FIG. 3, the CPU 50 is installed in the base plate 14, which is installed in the upper frame 11*b*, for example, and is a computer provided with a processor 53, a control unit 51, and a memory unit 52 configured by a ROM, a RAM, and the like.

The memory unit 52 is provided with a program memory 521, a design data memory 522, and a nail information memory 523. Note that the memory unit 52 is provided inside the CPU 50, but the memory unit 52 is not limited to this configuration, and may reside within a remote computer such as a server and be connected to the CPU 50 via a computer network, for example, and may be configured to be able to exchange information with the CPU 50.

Various programs to operate the nail printing apparatus 1 are stored in the program memory 521. For example, the various programs such as a nail information detection program for detecting the nail information (the first nail information) including information of the nail area, such as the nail contour of the nail T, a print program for performing print processing and the like are stored. The CPU 50 is configured to execute these programs and control each unit of the nail printing apparatus 1.

Further, the design data memory 522 stores image data of a nail design (a design image) to be printed on the nail T. The image data of the nail design stored in the design data memory 522 is, for example, rectangular data, and various sizes larger than the size of the general nail T are provided so as to correspond to various sizes of the nail T.

Further, the nail information memory 523 stores nail information (the first nail information and second nail information) including the information of the nail area of the nail T of the print finger U1 that has been detected by the nail information detection unit 512 (described later) and corrected by a nail information update unit 513, and information (finger identification information), which can identify the print finger U1.

Here, the nail information (the first nail information, and the second nail information) includes the contour of the nail T (a planar shape of the nail T represented by X-Y coordinates, and a position in the horizontal direction, for example), along with area correction information in which changes and corrections are applied to the detected shape, and update area setting information, which separates a variant area 711 (a second area on the nail free edge side of the nail) which is a portion that changes because a cut shape of the free edge portion of the nail T or the like has changed or the nail T has grown as a result of a physiological phenomenon, from a invariant area 712 (a first area on the nail root side of the nail) which is a portion close to the root of the nail T and whose shape does not significantly change, for example.

When seen in functional terms, the control unit 51 includes functional units, such as the imaging control unit 511, the nail information detection unit 512, the nail information update unit 513, the printing control unit 514, and a display control unit 515. Functions of the imaging control unit 511, the nail information detection unit 512, the nail information update unit 513, the printing control unit 514, the display control unit 515, and the like are realized by cooperation of the processor 53 and the programs stored in the ROM and the like of the memory unit 52. Note that the functional units included in the control unit 51 are not limited to those described herein.

The various units of the control unit 51 will be described below.

The imaging control unit 511 controls the imaging unit 30 and causes an image of the print finger U1 to be captured by the camera 32 that is the imaging device, and causes the finger image including the nail image of the nail T to be acquired.

The nail information detection unit 512 detects the nail information (the first nail information) including the information of the nail area of the nail T of the print finger U1, on the basis of the nail image in the finger image acquired by the camera 32. Here, the nail information (the first nail information) mainly refers to the contour of the nail T (the nail contour).

More specifically, the nail information detection unit 512 detects the contour of the nail T from the nail image of the nail T of the print finger U1 acquired by the camera 32, and acquires this contour as information represented by X, Y coordinates or the like. A method by which the nail information detection unit 512 detects the contour of the nail T is not particularly limited. For example, the nail information detection unit 512 detects the contour of the nail T on the basis of differences in color or the like between the nail T and part of the finger other than the nail T, from the nail image of the nail T of the print finger U1 acquired by the camera 32. The nail information (the first nail information) that is the result detected by the nail information detection unit 512 is stored in the nail information memory 523 (a nail information memory unit) of the memory unit 52.

As will be described in more detail later, the nail information update unit 513 reads out obtained nail information or the nail information stored in the nail information memory 523, and, after applying corrections to the nail information, stores the nail information in the nail information memory 523.

The printing control unit 514 outputs print data to the print head 46 of the print unit 40, on the basis of the image data of the nail design (the design image), and controls the print unit 40 such that the printing is performed on the nail T by the print head 46 in accordance with the print data. Note that the nail information detection unit 512 is configured to detect the nail information of the contour and the like of the nail T, and the print head 46 is configured to perform the printing on a predetermined range of the nail T of the print finger U1, on the basis of the nail information detected by the nail information detection unit 512 and registered in advance.

The display control unit 515 controls the display device 13, and causes various images and display screens to be displayed on the display device 13, such as the finger image obtained by imaging the print finger U1, the nail image included in the finger image (the image of the contour or the like of the nail T), the design selection screen for selecting the image (the design image, namely, the "nail design") to be printed on the nail T, the thumbnail image for design confirmation, the command screen displaying the various commands, and the like.

Next, an operation to correct the nail information in the nail information update unit 513 will be described.

Figure 6A:
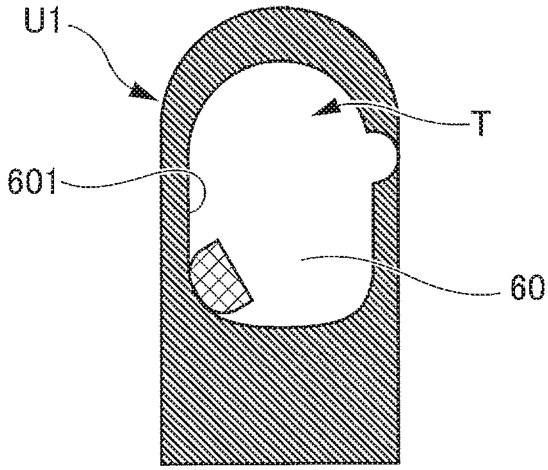
FIG. 6A is a plan view illustrating a nail area that is not accurately detected.

For example, as illustrated in FIG. 6A, as in the case of a nail area 60 in the detected nail information (the nail contour, the first nail information) of the nail T of the print finger U1 acquired by the camera 32, there is a case in which part of the detected nail area 60 is missing or is protruding from the correct nail area, and the nail area is not correctly detected. Further, as illustrated in FIG. 7B, there is a case in which it is desirable to perform printing using a specific shape, not on the whole surface of the nail T but only on a limited part of the area excluding the root of the nail T, as with a French manicure nail. In such a case, the detected nail area needs to be corrected and registered.

Figure 6B:
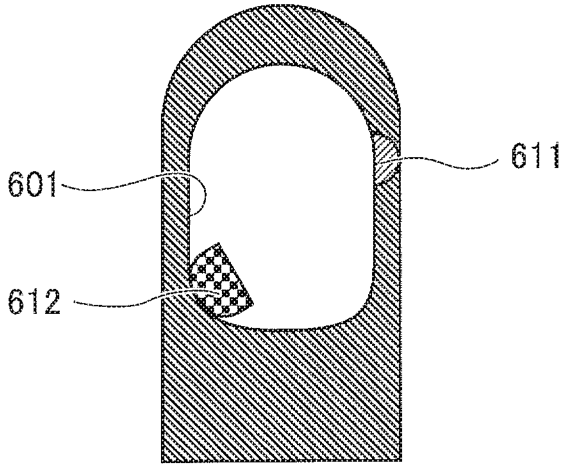
FIG. 6B is a plan view illustrating correction locations of the nail area.
Figure 6C:
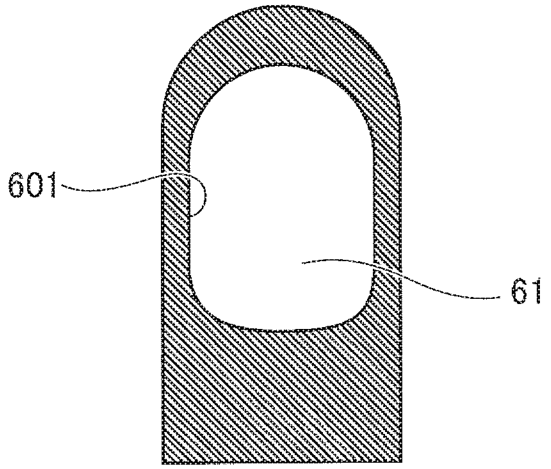
FIG. 6C is a plan view illustrating the nail area after correction.

More specifically, as illustrated in FIG. 6B, when correcting the nail area 60 illustrated in FIG. 6A, in a nail shape 601 displayed on the display device 13, the nail area 60 (the first nail information) is corrected to a nail area 61 (the second nail information) by narrowing an area of the nail T in order to eliminate a protruding area 611 and widening an area of the nail Tin order to fill in a missing area 612, for example, and the nail area 61 is registered (see FIG. 6C).

Further, as illustrated in FIG. 7A, when printing is not performed on the nail root side of the nail T, a non-print area 621 is removed from a nail area 62, and, as illustrated in FIG. 7B, the nail area 62 (the nail shape 601, the first nail information) is corrected to a nail area 63 (the second nail information).

In addition, after the nail information has been detected, there are cases in which a shape of the nail free edge side changes due to the growth of the nail T, as illustrated in FIG. 7C, in which the shape of the nail free edge side changes due to a change in the cut shape of the nail free edge, as illustrated in FIG. 7D, and in which the shape of the nail free edge side changes due to a part of the nail free edge side being missing due to an external impact or the like, as illustrated in FIG. 7E. In such a case, if the shape of the nail area of the nail information registered in advance is not corrected, there is a case in which a deviation arises between the design set on the basis of the nail area of the registered nail information and a result of actual printing, thus leading to a difference with an intended output result, such as a part of the design being missing or the like. Thus, in this type of case also, it is necessary to correct the nail area (the first nail information) and acquire the second nail information.

The correction can be performed, for example, by the user carrying out a touch operation or the like on the display device 13. Then, when the correction of the nail area (the first nail information) is performed, the nail information (the second nail information) including the nail area after the correction is registered in the nail information memory 523 by the nail information update unit 513.

Figure 8A:
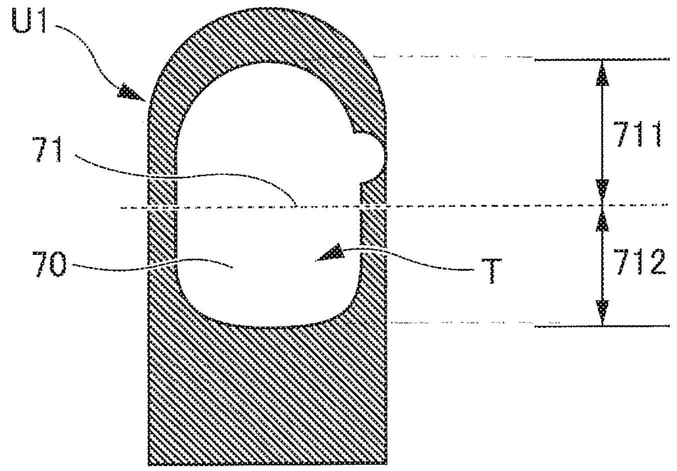
FIG. 8A is a plan view of the nail area illustrating an invariant area and a variant area set using a boundary line.
Figure 8B:
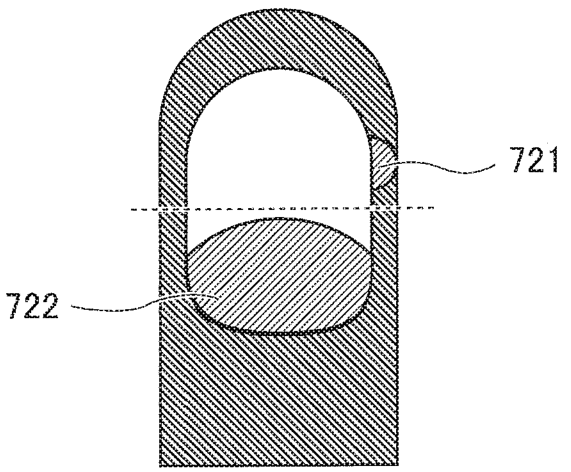
FIG. 8B is a plan view of the nail area when the non-print area is in the invariant area.
Figure 8C:
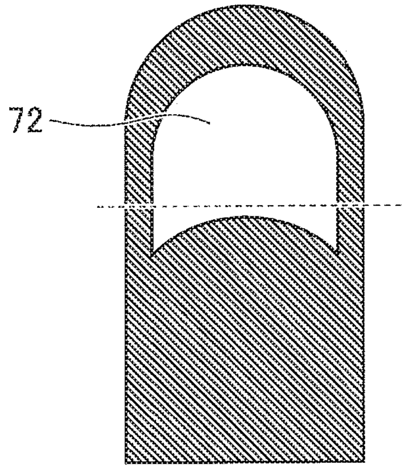
FIG. 8C is a plan view of the nail area illustrating the invariant area and the variant area reflecting the non-print area.

As illustrated in FIGS. 8A to 8C, a boundary line 71 can be set along the width direction of the nail T in an approximate center portion in the length direction of the nail T. The area of the nail T can be divided, using the boundary line 71 as a boundary, into an area (an invariant area 712) on the nail root side whose shape does not significantly change, and an area (a variant area 711) whose shape may change due to changes in a cut shape of the free edge side, or due to a physiological phenomenon of the nail growing, the nail being damaged due to an external force and the like. By automatically setting the boundary line 71 that divides the area of the nail T into the variant area 711 and the invariant area 712, on the area information configured by the detected nail contour, from the shape of the nail T of the print finger U1, for example (by calculating a center of the image from two-dimensional information of the nail contour and generating the boundary line 71 as a horizontal line that passes through the center of the image, for example), the nail information update unit 513 automatically distinguishes the variant area 711 and the invariant area 712. Note that the position of the boundary line 71 can be changed as desired. Then, the variant area 711 and the invariant area 712 can be registered in the nail information memory 523 while being distinguished from each other. The second nail information including the boundary line 71 and the like is registered in the nail information memory 523 by the nail information update unit 513.

As illustrated in FIG. 8A, when a nail area 70 (the first nail information) is detected, the boundary line 71 can be set, for example, in a position traversing the width direction at the approximate center portion of the nail T in the length direction. In the nail information (the second nail information) illustrated in FIG. 8B, a case is illustrated in which a non-print area 722 is included, on which printing is not performed on the nail root side, as with a French manicure nail. Note that when there is a protruding area 721, the correction is performed to remove the protruding area 721 as described above. Then, as illustrated in FIG. 8C, a nail area 72 (the second nail information) is set in which the non-print area 722 has been removed from the nail area 70 (the first nail information), and the nail area 72 (the second nail information) is registered in the nail information memory 523 by the nail information update unit 513.

Figure 9A:
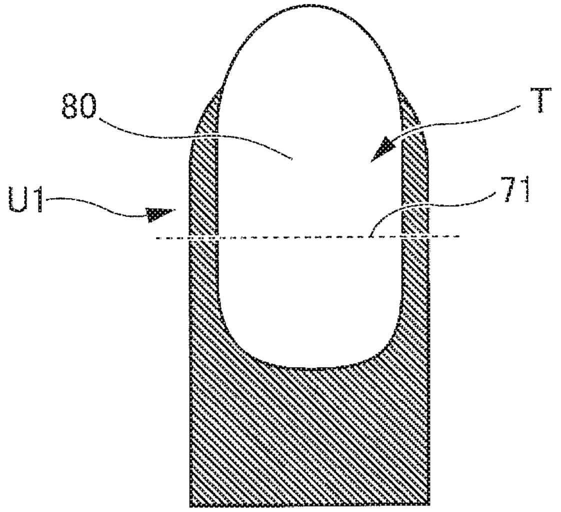
FIGS. 9A to 9C are plan views of cases in which a free edge of the variant area on the nail has grown, where
Figure 9B:
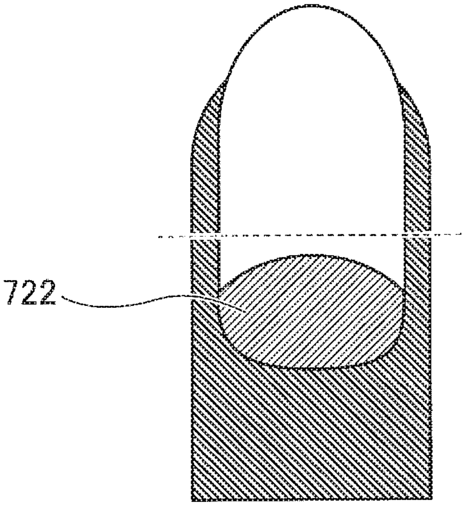
Figure 9C:
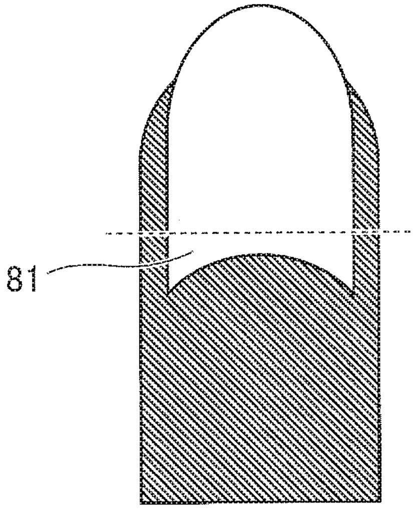

Further, in FIG. 9A, a nail area 80 (the first nail information) is illustrated of a case in which the free edge of the nail T has grown. In this case, the boundary line 71 is set further to the nail root side of the nail T than the center portion in the length direction of the nail T. FIG. 9B illustrates a case in which the non-print area 722 is included, on which the printing is not performed on the nail root side, as with a French manicure nail. Then, as illustrated in FIG. 9C, a nail area 81 (the second nail information) is set in which the non-print area 722 has been removed from the nail area 80 (the first nail information), and the nail area 81 (the second nail information) is registered in the nail information memory 523 by the nail information update unit 513.

In this way, the nail information (the nail contour and a nail curvature, the first nail information) and the nail image are registered in advance in the nail information memory 523. Then, when obtaining the nail area (the second nail information) in which the nail information (the first nail information) registered in advance has been corrected, or at a time of selecting the design image, the nail area or the nail image is displayed on the display device 13 as a background layer. Thus, when obtaining the corrected nail area or when selecting the design image, it is not necessary to set one's own finger in the finger holding parts 22. In this way, both hands become free, and the nail design can be edited while checking an actual finished image, in a state of favorable operability.

Further, from the nail image, the nail information detection unit 512 can identify the invariant area 712 and the variant area 711, and the nail information memory 523 can distinguish and register the invariant area 712 and the variant area 711, and the CPU 50 of the nail printing apparatus 1 can read out the invariant area 712 corresponding to the print finger U1 having the nail T to be printed on. Then, for the invariant area 712 that does not need correction, the nail area (the second nail information) that reflects the correction content of a previous time (area correction information) that is already registered can be read out, and this second nail information can be used. Then, the user does not need to correct the whole area of the nail area (the effective range of the design editing) each time the nail design is printed on the nail T, and only needs to perform the correction on the variant area 711 that needs correcting. Then, there is no need to duplicate the same correction operation, and operation efficiency by the user can be improved, and reproducibility of the design can be enhanced.

Next, the nail printing method according to the present embodiment will be described.

Figure 4:
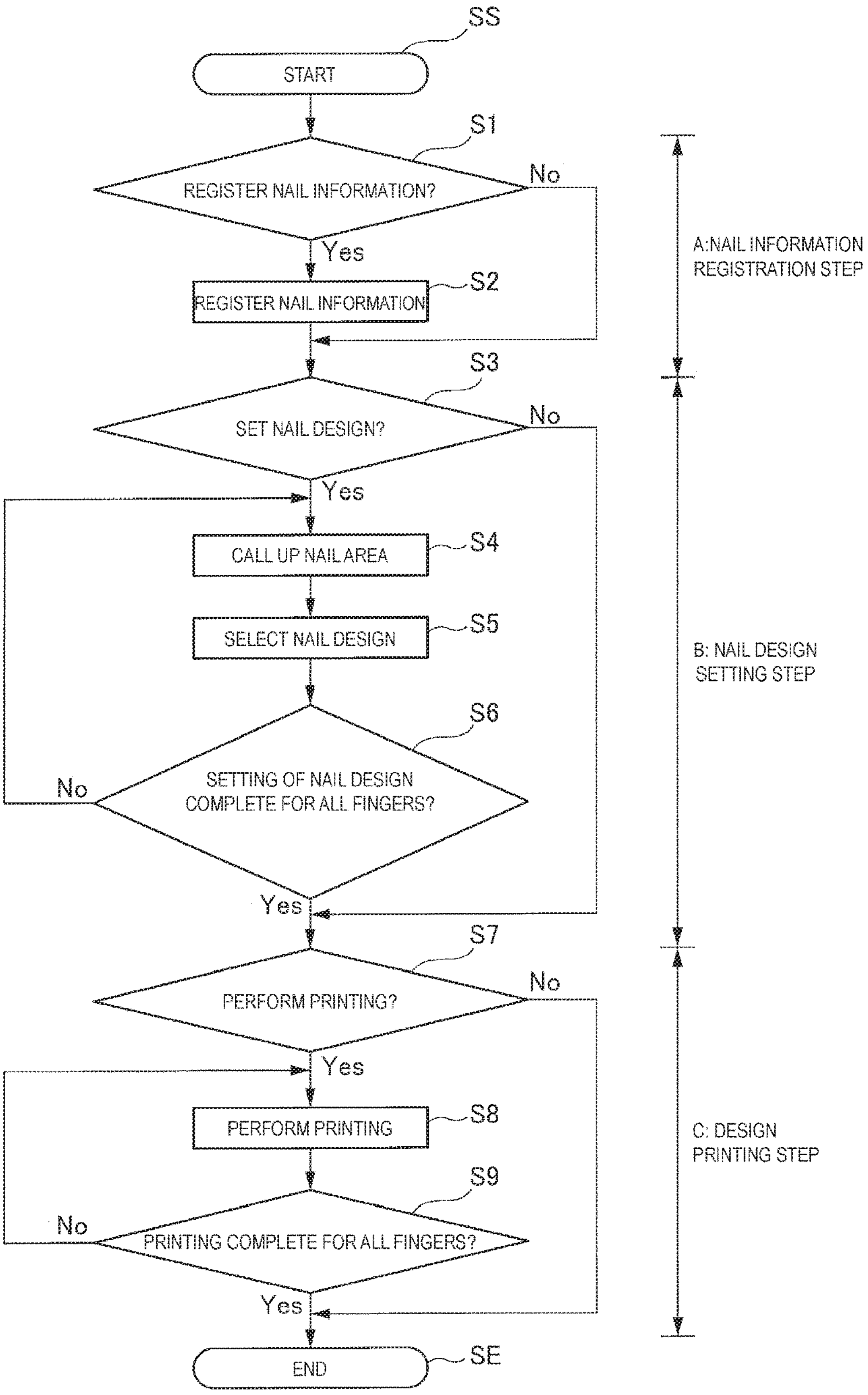
FIG. 4 is a flowchart illustrating a nail printing method according to the present embodiment.

As illustrated in FIG. 4, the nail printing method of the present embodiment includes the following steps: A: a nail information registration step; B: a nail design setting step; and C: a design printing step. The nail information is registered in advance and the nail design selection and the printing are performed using the registered nail information.

Thus, when a nail printing operation is started (step SS), a determination is made as to whether to perform registration of the nail information (step S1), and in accordance with a determination that the nail information is to be registered, the registration of the nail information is performed (step S2). Note that a method of registering the nail information will be described in detail below. Then, in accordance with a determination, at step S1, that the registration of the nail information is not to be performed, the processing advances to step S3.

In accordance with a determination, at step S1, that the registration is not to be performed, and in accordance that the registration of the nail information for all of the fingers is complete, a determination is made as to whether the nail design is to be set (step S3), and in accordance with a determination that the nail design is to be set, the nail area in the registered nail information is read out and displayed on the display device 13 (step S4). Then, the selection of the nail design and the like is performed with respect to the displayed nail area (step S5), and a determination is made as to whether the setting of the nail design has been performed for all of the fingers (step S6), and in accordance with a determination that the setting is not complete for all of the fingers, the processing returns to step S4 and the same steps are repeated.

In accordance with a determination, at step S3, that the setting of the nail design is not to be performed, and when the setting of the nail design has been performed for all of the fingers, a determination is made as to whether the printing is to be performed (step S7). In accordance with a determination that the printing is to be performed, each of the fingers is sequentially inserted into the print finger holding unit 20 and the printing is performed (step S8). Then, a determination is made as to whether the printing is complete for all of the fingers (step S9), and when the printing has been performed for all of the fingers, the nail printing operation ends (step SE). Note that the processing also ends at step SE in accordance with a determination, at step S7, that the printing is not to be performed.

Next, the method of registering the nail information will be described.

Figure 5:
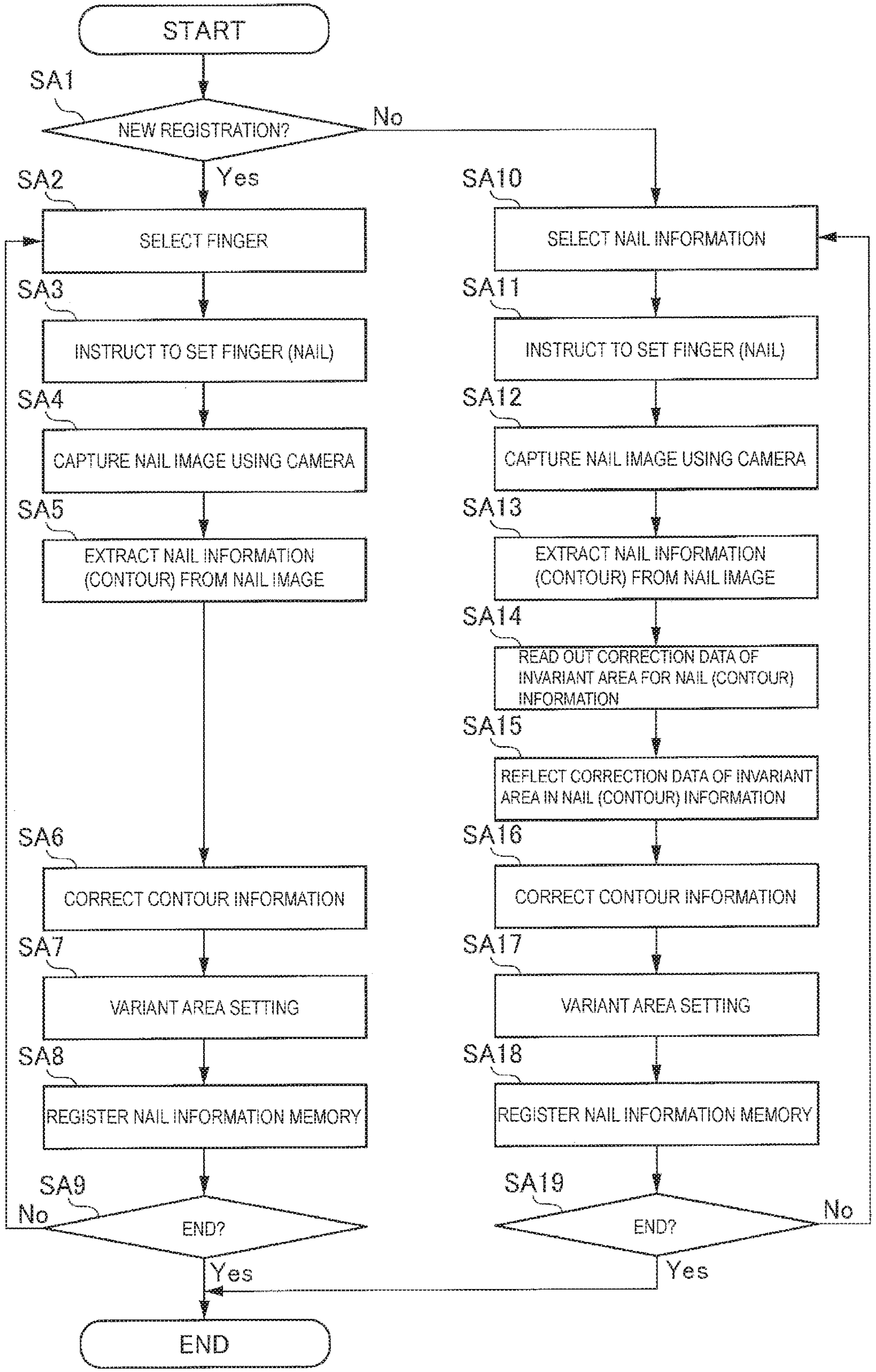
FIG. 5 is a flowchart illustrating a method of registering nail information.

FIG. 5 is a flowchart illustrated the method of registering the nail information.

First, a determination is made as to whether there is a new registration of the nail information (step SA1), and in accordance with a determination of the new registration, a selection is made for which finger, such as left or right, the registration of the nail information is to be made (step SA2). In response to the finger being selected, the display device 13 performs guidance display prompting the print finger U1 to be set in the nail printing apparatus 1 (step SA3).

When the print finger U1 is set in the print finger holding unit 20, the nail image is captured by the camera 32 (step SA4), and the nail information (the contour, the first nail information) including the nail area is extracted from the captured nail image (step SA5, see FIG. 6A, for example). At this time, in accordance that the correction of the nail area is necessary, as described above, the correction with respect to the nail area is performed on the screen of the display device 13 (step SA6, see FIG. 6B, for example). Next, as described above, the boundary line 71 (see FIG. 8) is set from the nail information (the first nail information) obtained at step SA5, and the variant area 711 and the invariant area 712 are automatically distinguished (step SA7). Since the boundary line 71 can be changed as desired through the settings and the like, the variant area 711 and the invariant area 712 can be changed as needed.

Then, the nail information (the second nail information) after the correction, including the nail shape 601, the nail area 72, the boundary line 71, the non-print area 722 in the invariant area 712 and the like, is registered in the nail information memory 523 (step SA8).

Next, when the registration of the nail information for another finger is to be performed (step SA9), the processing returns to step SA2, and the steps after that are repeated.

On the other hand, in accordance with a determination, at step SA1, that the nail information is already registered, the processing advances to step SA10, the finger that has already been registered is selected and the nail information for that finger is selected. This is, for example, an operation that is performed when changing the cut shape of the free edge portion of the nail T from a rounded shape to a slightly pointed oval shape, and when the shape of the free edge portion of the nail T has changed as a result of the nail T growing and becoming longer, and in this case, it is necessary to change and update the registered nail information.

In response to the finger being selected, the display device 13 performs the guidance display prompting the selected finger to be set in the nail printing apparatus 1 (step SA11). Then, when the finger is set in the print finger holding unit 20, the nail image is captured by the camera 32 (step SA12), and the nail information (the contour and the like) is extracted from the captured nail image (step SA13, see the nail area 80 illustrated in FIG. 9A, for example).

Next, the non-print area 722 (the second nail information) that is correction data in the invariant area 712 is read into the nail information (the first nail information) selected at step SA10 (step SA14, see FIG. 9B). Then, the non-print area 722 (the second nail information) that is the correction data read at step SA14 is reflected in the nail information (the nail contour, the first nail information) detected at step SA13 (step SA15, see the nail area 81 illustrated in FIG. 9C).

Further, as needed, in accordance that the correction of the area is necessary, the correction is performed on the contour shape on the screen on the display device 13 (step SA16), the area settings are changed by changing the boundary line 71 (step SA17), and, on the basis of the corrected nail information (the first nail information, and the second nail information), the nail area is registered in the nail information memory 523 (step SA18).

Then, when the registration of the nail information for another finger is to be performed (step SA19), the processing returns to step SA10, and the steps after that are repeated. When the registration of the nail information for all the fingers is complete, the nail information registration ends.

A preferable embodiment of the present invention is described in detail above, but the nail printing apparatus 1 and the nail print method according to the present invention are not limited to the above-described embodiment, and various modifications and changes can be made within the spirit and scope of the claims of the present invention.

For example, in the above-described embodiment, the nail information is displayed on the display device 13 provided in the nail printing apparatus 1, and the correction of the nail information and the selection of the nail design and the like are performed using the operation unit 12 provided in the nail printing apparatus 1. However, the configuration is not limited to this example, and the display and the operations can be performed, for example, on an external device, such as a smartphone, using short-range wireless communication, such as Bluetooth. Note that Bluetooth is a trade name.

Further, in the above-described embodiment, the setting of the boundary line 71 between the invariant area 712 and the variant area 711 can be changed as desired, but a comparison may be made with past image capture information, and an area with a small amount of change may automatically be set as the invariant area 712.

In addition, in the above-described embodiment, the example is illustrated in which the program memory 521, the design data memory 522, and the nail information memory 523 are provided in the memory unit 52 of CPU 50, but the configuration is not limited to this example, and they may be provided in a memory unit that is provided separately.

As described above, according to the nail printing apparatus 1 of the present invention, since the nail printing apparatus 1 includes the print finger holding unit 20 that positions the print finger U1, the camera 32 that captures the image of the nail T of the print finger U1 positioned using the print finger holding unit 20, and the nail information detection unit 512 that detects the nail contour from the nail image obtained by the camera 32, the nail printing apparatus 1 can capture the image of the nail T in a stable manner, and can accurately detect the contour of the nail T.

Further, since the nail information update unit 513 corrects the nail information detected by the nail information detection unit 512, and the nail printing apparatus 1 includes the nail information memory 523 that registers the nail information detected by the nail information detection unit 512 and the nail information corrected by the nail information update unit 513, the nail information can be read out as necessary. Thus, as well as being able to apply the design stored in the design data memory 522 to the read out nail contour and select the design to be printed on the nail T, the printing can be performed using the print unit 40.

In this way, by using the nail information corrected the previous time, the time and effort required in the correction can be eliminated, and the design that has previously been beautifully corrected can be reproduced. Further, the nail information (the nail contour and the nail curvature), and the nail image are registered in advance in the nail information memory 523, and, when correcting the nail information or selecting the design, the nail area of the registered nail information is displayed on the display device 13. Thus, when correcting the nail information or selecting the design, it is not necessary to set one's own finger in the finger holding parts 22, both hands become free, and the editing can be performed while checking an actual finished image, in a state of favorable operability.

Further, according to the nail printing apparatus 1 of the present invention, the nail information detection unit 512 distinguishes, from the nail image, the invariant area 712 that is the nail area that never changes, and the variant area 711 that is the nail area which may possibly change, and also, the nail information update unit 513 corrects the invariant area 712 (the second nail information) and registers this in the nail information memory 523. In this way, when reading out the nail information (the first nail information, and the second nail information) and performing the nail design, the invariant area 712 (the second nail information) can be used without being corrected, and thus, by using the nail information (the second nail information) corrected the previous time, for areas that do not require correction, such as the nail root side of the nail, it is possible to eliminate the time and effort for correction, such as an operation to repeat the same correction content each time the information of the nail area is updated. As a result, the user operability can be improved, and also, the beautifully corrected design can be relatively easily reproduced.

Furthermore, according to the nail printing apparatus 1 of the present invention, the print unit 40 discharges the plurality of color inks from the print head 46 and performs the printing on the nail T using the inkjet method, and thus, the nail printing apparatus 1 can reduce costs and can be made more compact.

As described above, according to the nail printing method of the present invention, the image is captured of the print finger U1 that has been positioned in the predetermined position, using the imaging unit 30, and the nail information (the first nail information) is detected. The detected nail information (the first nail information) is corrected as necessary, and the detected nail information (the first nail information) and the corrected nail information (the second nail information) are stored in the nail information memory 523. Then, when performing the nail design, as well as setting the nail area with respect to the registered nail information (the first nail information, and the second nail information), the design image to be printed on the nail area is selected and printed. Thus, by using the nail information (the second nail information) corrected the previous time, the time and effort for the correction can be eliminated and the beautifully corrected design can be relatively easily reproduced. Further, the nail information (the first nail information, and the second nail information) is registered in advance in the nail information memory 523, and, when correcting the nail information (the first nail information or the second nail information) or selecting the design, the nail area of the registered nail information (the first nail information, and the second nail information) is displayed on the display device 13. Thus, when performing the above operations, it is not necessary to set one's own finger in the finger holding parts 22, both hands become free, and the editing can be performed while checking an actual finished image, in a state of favorable operability.

Further, according to the nail printing method of the present invention, the invariant area 712 that is the nail area that never changes, and the variant area 711 that is the nail area which may possibly change are distinguished from each other, from the detected nail information (the first nail information), and also, the invariant area 712 (the second nail information) is corrected and registered. In this way, when reading out the nail information (the first nail information, and the second nail information) and performing the nail design, the same invariant area 712 can be used without being corrected, and thus, by using the nail information (the second nail information) corrected the previous time, the time and effort for correction can be eliminated, and also, the beautifully corrected design can be relatively easily reproduced.

In addition, according to the nail printing method of the present invention, the registered invariant area 712 (the second nail information) is used and the variant area 711 is changed when necessary. Thus, the time and effort for correction can be eliminated, and also, the beautifully corrected design can be relatively easily reproduced.

A nail printing apparatus and a control method for a nail of a finger of a hand is described herein. However, those skilled in the art will readily appreciate that the detailed description given herein is for explanatory purposes only and should not be construed as limiting and is also applicable to a nail of a toe of a foot.

The invention claimed is:

1. A nail printing apparatus comprising:

a print head that prints on a nail of one of a finger of a hand and a toe of a foot; and a processor, wherein the processor performs:

detecting a nail area from a nail image captured of the nail;

dividing the nail area into a first area on a nail root side of the nail and a second area on a nail free edge side of the nail; and storing information of the first area in a memory, wherein, when the information of the first area of the nail is already stored in the memory, the processor reads out the information of the first area stored in the memory without detecting the first area.

2. The nail printing apparatus according to claim 1, wherein the processor stores the information of the first area in the memory in association with identification information of the one of the finger and the toe to which the nail belongs, and wherein, when the information of the first area of the nail is already stored in the memory, the processor reads out, from the memory, the information of the first area stored in the memory that is associated with the identification information of the one of the finger and the toe to which the nail belongs.

3. The nail printing apparatus according to claim 1, wherein the processor stores the information of the first area in the memory after correction of the information of the first area, and reads out the information of the first area while detecting the nail area from the nail image in a state in which the information of the first area after the correction is stored in the memory.

4. The nail printing apparatus according to claim 3, wherein the processor, when detecting the nail area from the nail image in a state in which the information of the first area after the correction is stored in the memory, detects only the second area based on the nail image.

5. The nail printing apparatus according to claim 3, further comprising:

a display device;

wherein the processor displays the nail area on the display device based on information of the nail area stored in the memory, and allows correction of the nail area displayed on the display device to be performed.

6. The nail printing apparatus according to claim 1, wherein in the dividing, the processor sets a boundary line along a width direction of the nail in the nail area, and defines, in the nail area, the nail root side of the nail from the boundary line as the first area, and the nail free edge side of the nail from the boundary line as the second area.

7. The nail printing apparatus according to claim 1, wherein, when a non-print area on which the printing by the print head is not to be performed is set in the nail area, the processor excludes the non-print area from the nail area divided into the first area and the second area.

8. A control method of a nail printing apparatus including a print head that performs printing on a nail of a finger of a hand and a toe of a foot, the control method comprising:

detecting a nail area from a nail image captured of the nail;

dividing the nail area into a first area on a nail root side of the nail and a second area on a nail free edge side of the nail; and storing information of the first area in a memory, wherein, when the information of the first area of the nail is already stored in the memory, the information of the first area stored in the memory is read out from the memory without detecting the first area.

9. The control method according to claim 8, wherein the storing includes, when corrections are applied to the first area, storing information of the first area after the correction in the memory, and wherein the reading out includes, when detecting the nail area from the nail image in a state in which the information of the first area after the correction is stored in the memory, reading the information of the first area from the memory to use the information of the first area.

10. The control method according to claim 8, further comprising:

storing the information of the first area in the memory after correction of the information of the first area; and reading out the information of the first area while detecting the nail area from the nail image in a state in which the information of the first area after the correction is stored in the memory.

11. The control method according to claim 10, further comprising, when detecting the nail area from the nail image in a state in which the information of the first area after the correction is stored in the memory, detecting only the second area based on the nail image.

12. The control method according to claim 10, further comprising displaying the nail area on a display device based on information of the nail area stored in the memory, and allowing correction of the nail area displayed on the display device to be performed.

13. The control method according to claim 8, further comprising:

setting a boundary line along a width direction of the nail in the nail area; and defining, in the nail area, the nail root side of the nail from the boundary line as the first area, and the nail free edge side of the nail from the boundary line as the second area.

14. The control method according to claim 8, further comprising, when a non-print area on which the printing by the print head is not to be performed is set in the nail area, dividing an area excluding the non-print area from the nail area into the first area and the second area.

* * * * *